United States Patent
Benezech et al.

(10) Patent No.: US 9,239,010 B2
(45) Date of Patent: Jan. 19, 2016

(54) FUEL FLOWMETER HAVING AN IMPROVED REGULATOR DEVICE

(75) Inventors: Philippe Jean Rene Marie Benezech, Lons (FR); Bruno Facca, Morlass (FR); Ludovic Alexandre Leglise, Pau (FR); Cedric Roger Zordan, Narcastet (FR)

(73) Assignee: TURBOMECA, Bordes (FR)

( * ) Notice: Subject to any disclaimer, the term of this patent is extended or adjusted under 35 U.S.C. 154(b) by 965 days.

(21) Appl. No.: 13/496,216

(22) PCT Filed: Aug. 26, 2010

(86) PCT No.: PCT/FR2010/051779
§ 371 (c)(1),
(2), (4) Date: Mar. 15, 2012

(87) PCT Pub. No.: WO2011/036363
PCT Pub. Date: Mar. 31, 2011

(65) Prior Publication Data
US 2012/0174587 A1    Jul. 12, 2012

(30) Foreign Application Priority Data
Sep. 23, 2009  (FR) ...................... 09 56540

(51) Int. Cl.
F16K 31/12 (2006.01)
F02C 7/232 (2006.01)
F02C 9/26 (2006.01)

(52) U.S. Cl.
CPC ............... *F02C 7/232* (2013.01); *F02C 9/263* (2013.01); *F05D 2270/3015* (2013.01); *Y10T 137/7773* (2015.04)

(58) Field of Classification Search
CPC .. F02C 7/232; F02C 9/263; F05D 2270/3015; Y10T 137/7773; Y10T 137/7781; Y10T 137/7787; Y10T 137/2579; G05D 16/16; G05D 16/063; G05D 16/0661
See application file for complete search history.

(56) References Cited

U.S. PATENT DOCUMENTS 2,917,067 A * 12/1959 Pearl .................... F02C 7/232
                                             137/115.1
2,958,376 A    11/1960 Williams
(Continued)

FOREIGN PATENT DOCUMENTS

EP    0 288 411    10/1988
FR    2 339 203    8/1977
(Continued)

OTHER PUBLICATIONS

Decision on Grant issued Jun. 3, 2014, in Russian Patent Application No. 2012116066/06 (English-language translation only).
(Continued)

*Primary Examiner* — Jessica Cahill
(74) *Attorney, Agent, or Firm* — Oblon, McClelland, Maier & Neustadt, L.L.P.

(57) ABSTRACT

A fuel flowmeter for being fed by a pump including an inlet and an outlet, including: a metering valve including an inlet and an outlet, and arranged downstream from the outlet of the pump; a return circuit connecting the inlet of the metering valve to the inlet of the pump; and a pressure regulator device including: a movable valve member to close and open the return circuit, a pressure difference detection surface fastened to the valve member and axially separating a first chamber in communication with the inlet of the metering valve from a second chamber in communication with the outlet from the metering valve, a piston axially separating the second chamber from a third chamber connected to the outlet of the metering valve, and a channel putting the second chamber in communication with the third chamber.

15 Claims, 6 Drawing Sheets

(56) References Cited

U.S. PATENT DOCUMENTS

| | | | |
|---|---|---|---|
| 3,005,464 A | 10/1961 | Huckins | |
| 4,066,091 A * | 1/1978 | Itoh | F02D 11/08 |
| | | | 137/79 |
| 4,098,285 A | 7/1978 | Karing | |
| 4,716,723 A * | 1/1988 | Ralston | F01D 21/02 |
| | | | 60/39.281 |
| 4,805,658 A | 2/1989 | Perkinson et al. | |
| 5,078,173 A | 1/1992 | Spencer et al. | |
| 5,327,720 A * | 7/1994 | Tran | F02C 7/232 |
| | | | 137/489.5 |
| 5,433,237 A | 7/1995 | Kao et al. | |
| 5,797,418 A | 8/1998 | Lechevalier | |
| 6,381,946 B1 * | 5/2002 | Wernberg | F02C 9/263 |
| | | | 60/39.281 |

FOREIGN PATENT DOCUMENTS

| | | | | |
|---|---|---|---|---|
| GB | 585032 A * | 1/1947 | | F02C 9/263 |
| GB | 2 296 960 | 7/1996 | | |
| RU | 2 029 122 C1 | 2/1995 | | |
| RU | 2 193 097 C2 | 11/2002 | | |

OTHER PUBLICATIONS

International Search Report Issued Feb. 11, 2011 in PCT/JP10/51779 Filed Aug. 26, 2010.

* cited by examiner

FUEL FLOWMETER HAVING AN IMPROVED REGULATOR DEVICE

FIELD OF THE INVENTION

The present invention relates to the field of regulating the feed of fuel through an engine such as a turbine engine of an aircraft.

BACKGROUND OF THE INVENTION

More particularly, the present invention relates to a fuel flowmeter for being fed by a pump having an inlet and an outlet, said flowmeter comprising:
 a metering valve having an inlet and an outlet, said valve being arranged downstream from the outlet of the pump;
 a return circuit connecting the inlet of the metering valve to the inlet of the pump; and
 a pressure regulator device comprising a movable valve member suitable for closing and opening the return circuit, a pressure difference detection surface fastened to the valve member and axially separating a first chamber in communication with the inlet of the metering valve from a second chamber in communication with the outlet from the metering valve, a first spring arranged in the second chamber while being fastened to the detection surface in such a manner as to exert axial thrust on the valve member in a direction tending to close the return circuit.

One such flowmeter 10 that is already known from elsewhere is shown in FIG. 1. In known manner, the flowmeter is fed upstream by a pump 12 delivering a flow of fuel at a rate that is greater than the rate needed by the engine. The metering valve 14 is arranged between the pump and the injectors of the combustion chamber. This valve is designed to deliver a flow rate Q that is a function of the extent to which it is opened, which extent is controlled by a valve regulator system.

In order to obtain a flow rate that depends mainly on the extent to which the metering valve 14 is opened, the pressure difference between the outlet 14b and the inlet 14a of the metering valve must be maintained constant, at a predetermined value, or at least within a limited range. That is the role of the regulator device 16, generally referred to as a "delta-P" valve.

For this purpose, the regulator device 16 has two functions: its first function is to detect pressure variation between the outlet and the inlet of the metering valve 14. This first function is performed by the detection surface 18 that is constituted in this example by a diaphragm, and by the first spring 20, the diaphragm being capable of moving axially against the force of the first spring if the pressure difference is greater than the above-mentioned predetermined value.

Under such circumstances, the valve member 24 opens the return circuit 22, thereby allowing fuel to flow from the inlet to the metering valve 14a back to the inlet 12a of the pump 12, or increasing the rate of the return flow, thereby diminishing the flow rate through the metering valve 14. As a result, the pressure difference between the outlet and the inlet of the metering valve diminishes until it reaches the predetermined value, thereby causing the valve member 24 to close under drive from the first spring 20.

It is specified that the regulator device 16 is initially calibrated in such a manner that the return circuit 22 remains closed by the valve member 24 so long as the pressure difference is below the predetermined value.

Thus, the regulator device maintains an almost constant pressure difference (equal to the predetermined value) between the outlet and the inlet of the metering valve.

It is also specified that the action of the valve member 24 is generally progressive, thus enabling the valve member 24 to occupy an equilibrium position.

A drawback of this flowmeter arises in the event of the diaphragm being damaged. It can be understood that if the diaphragm is pierced or if it no longer achieves sealing between the first and second chambers, there is no longer a pressure difference between the first and second chambers of the regulator device, and as a result the force exerted on the valve member becomes equal solely to the force exerted by the first spring. This causes the return circuit 22 to be closed and leads to a significant and undesirable increase in the rate at which fuel is supplied to the engine.

SUMMARY OF THE INVENTION

An object of the present invention is to remedy this drawback by proposing an improved fuel flowmeter in which the regulator device continues to maintain a constant pressure difference even in the event of the detection surface 18 being damaged.

The invention achieves its object by the fact that the regulator device further comprises a piston axially separating the second chamber from a third chamber connected to the outlet of the metering valve, said piston including a coupling member suitable for co-operating with the valve member, a second spring arranged in the third chamber while exerting axial thrust on the piston tending to keep the piston decoupled from the valve member, the regulator device also including a channel putting the second chamber in communication with the third chamber.

Thus in the event of the detection surface breaking, the pressure in the first chamber becomes equal to the pressure in the second chamber. As a result the valve member begins by closing the return circuit. The fuel then flows through the channel, which then acts as a nozzle, thereby creating head loss between the second chamber and the third chamber.

Preferably, but not necessarily, the pressure difference detection surface is a flexible diaphragm. It is equally possible to provide a bellows or any other equivalent surface.

The movement of the piston is controlled as a function in particular of the pressure difference between the third chamber and the second chamber, which difference corresponds specifically to the pressure difference between the outlet from the metering valve and the inlet to the metering valve.

When the pressure difference becomes greater than a new predetermined value, depending on the stiffness and on the preloading of the second spring, the piston moves towards the third detection chamber against the force of the second spring until the coupling member comes into contact with the valve member, after which the piston continues to move while taking the valve member with it.

As a result, the return circuit is opened and the pressure difference between the outlet and the inlet of the metering valve is decreased. It can thus be understood that the regulator device of the flowmeter of the invention keeps this pressure difference constant in spite of the diaphragm being damaged. Under such circumstances, it is thus the piston, the two springs, the channel, and the valve member that act advantageously as an emergency regulator device.

During normal operation of the diaphragm, the piston does not move and the channel makes it possible to ensure that the pressure in the second spring corresponds to the pressure of fuel at the outlet from the metering valve. The valve member is then free to move relative to the piston, on the same principle as in the prior art flowmeter.

In a preferred but non-exclusive embodiment, the valve member is mounted at the end of a sliding cage that extends axially within the second chamber, the first spring being housed inside the cage while being held at its opposite end from the valve member by an adjustment rod extending between the second chamber and the third chamber.

This adjustment rod enables the preload on the spring to be adjusted and thus enables the predetermined value for the pressure difference that it is desired to maintain across the metering valve to be adjusted.

Preferably, the nozzle-forming channel is formed in the adjustment rod. Nevertheless, it is possible for the channel to be formed in the piston, in the housing, or in any other element that is contiguous with the chamber 26 and with the chamber 30.

In a variant, the channel is arranged in such a manner that it is closed by the piston when the piston is coupled with the cage. It can be understood that when the channel is closed, fuel does not flow any longer between the first and second chambers.

One advantage is to avoid supplying an undesirable additional flow rate to the engine by providing the fuel with a path in parallel with the metering valve 114.

In another variant, the channel presents a first section and a second section greater than the first section, such that the fuel flows via the first section when the piston is not coupled to the cage, while the fuel flows via the second section when the piston is coupled to the cage.

By way of example, an advantage may be to increase the flow rate so that the system controlling the metering valve can detect malfunction of the diaphragm. Suitable choices for the dimensions of the piston, for the stiffness, and for the prestress of the second spring 164 then enable the pressure difference across the metering valve to be adjusted to the same value, regardless of the state of the diaphragm. The flowmeter then delivers the same flow rate regardless of the state of the diaphragm. Nevertheless, in the event of the diaphragm being damaged, the designer may seek to increase the flow rate in controlled manner so that an effect is produced on the device consuming the metered fluid, but without that effect being dangerous for that device. Thus, the pilot may advantageously be informed that the pressure difference is now being regulated by the cage, the valve member, the first spring, and the second spring.

In a preferred variant, the piston is in the form of a slide and the coupling member comprises fingers designed to co-operate with an abutment surface of the cage so as to be capable of moving the cage axially and opening the return circuit when the detection surface is damaged.

When the detection surface is not damaged, the coupling member does not co-operate with the valve member. In other words, the piston does not move the valve member and it is totally passive.

The invention also provides a fuel circuit for a turbine engine, the circuit including a pump and a fuel flowmeter of the invention.

Finally, the invention provides a turbine engine including a fuel circuit of the invention.

BRIEF DESCRIPTION OF THE DRAWINGS

The invention can be better understood and its advantages appear better on reading the following description of an embodiment given by way of non-limiting example. The description refers to the accompanying drawings, in which.

DETAILED DESCRIPTION OF PREFERRED EMBODIMENTS

Figure 1:
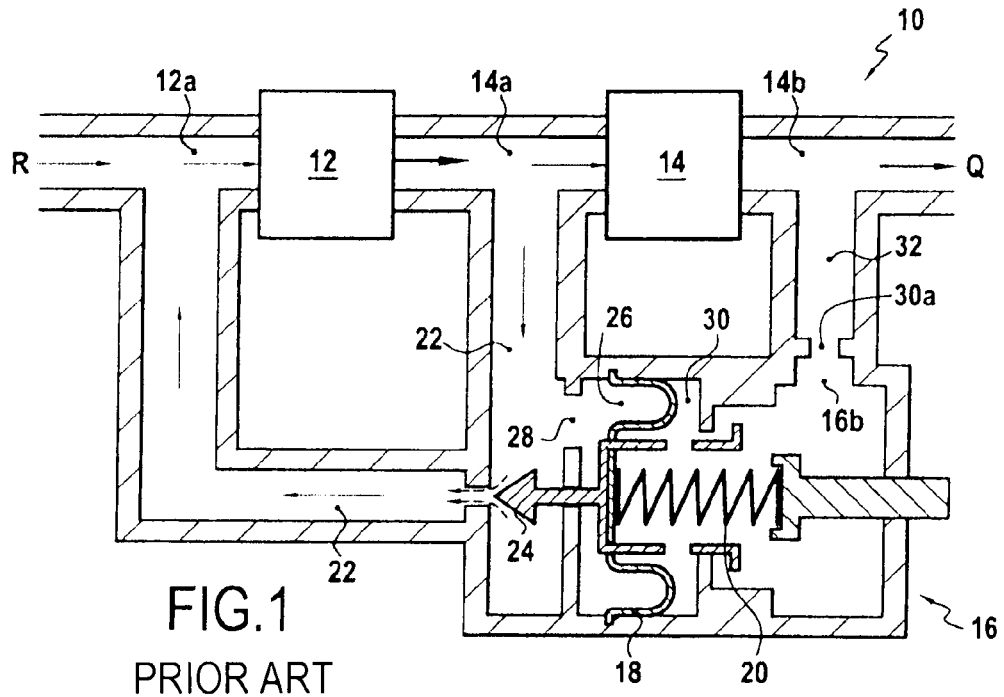
FIG. 1 shows a prior art fuel flowmeter having a pressure difference detection surface that is not damaged, the valve member being in its open position.
Figure 2:
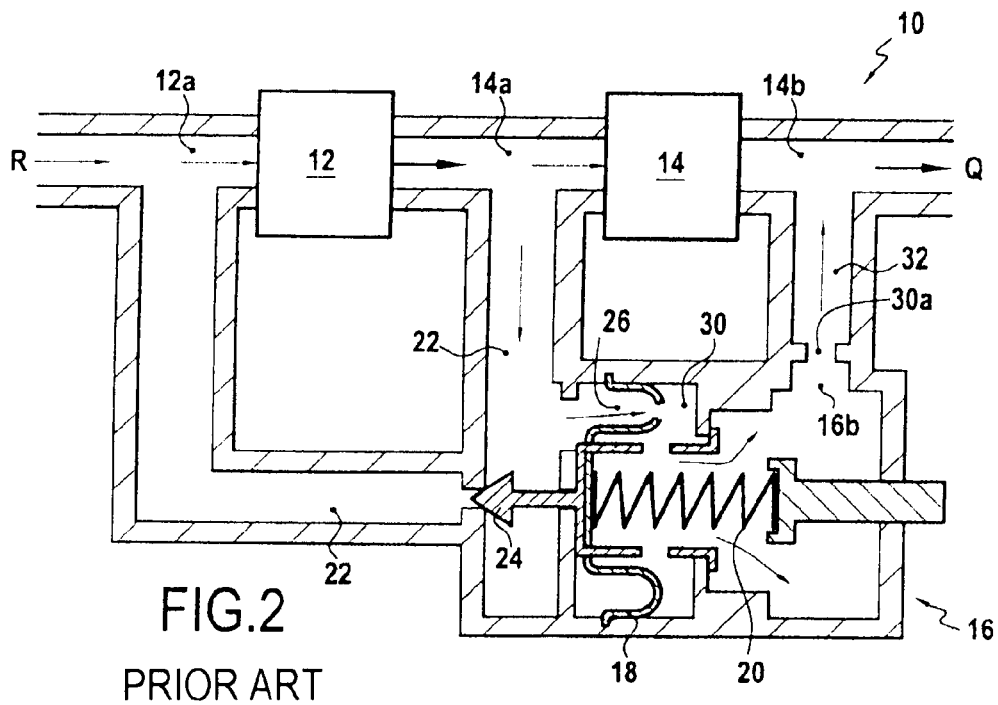
FIG. 2 shows the FIG. 1 flowmeter when the pressure difference detection surface is pierced.

FIG. 1, which shows the prior art fuel flowmeter, is described in part above in the introduction to the description. It is specified that the pump is connected to a fuel tank R and that the regulator device 16 has a first chamber 26 in communication with the return circuit 22. This communication preferably takes place via an opening 28 formed upstream from the valve member 24.

In normal operation, this first chamber is defined in particular by the detection surface 18, specifically a flexible diaphragm, such that the pressure in the first chamber is equal to the pressure at the inlet 14a to the metering valve 14.

The prior art regulator device also includes a second chamber that is defined by the diaphragm 18 and that communicates with an outlet circuit 32 connecting the outlet 16b of the regulator device to the outlet 14b of the metering valve 14. It can thus be understood that the pressure of fuel in the second chamber is equal to the pressure at the outlet 14b of the metering valve 14.

A nozzle 30a may optionally be installed in the outlet circuit 32 in order to damp movements of the valve member.

Reference Q indicates the flow rate of fuel leaving the valve. It corresponds to the flow rate that is delivered to the injectors of the engine (not shown).

In FIG. 1, the valve member 24 is open since the pressure difference detected by the diaphragm 18 is greater than the predetermined value set by the adjustment of the first spring 20. As a result, and as explained above, excess fuel supplied by the pump is returned to the inlet of the pump via the return circuit 22.

In the event of the diaphragm 18 being damaged, some of the fuel leaving the pump is free to flow through the pierced diaphragm into the second chamber 30 and then to the outlet 14b of the flowmeter via the orifice 30a. The pressure difference between the first and second chambers is then zero or very small, so the valve member remains in the closed position regardless of the pressure exerted at the inlet. The return circuit is closed. As a result the entire flow of fuel leaving the pump 12 goes to the outlet of the flowmeter, either through the valve 14 or else through the regulator device 16 in the manner described above. It follows that the "constant delta-P" regulator device 16 no longer performs its function and the pressure difference across the valve 14 is no longer constant. This means that the flow rate delivered by the flowmeter does not vary as a function of the extent to which the metering valve 14 is opened in application of the expected relationship, and that is contrary to the primary function of the flowmeter. In general but non-exclusive manner, the flow rate is then higher than it would be if the diaphragm were not pierced.

With reference to FIGS. 3 to 6, there follows a description in greater detail of the fuel flowmeter 110 in accordance with the present invention.

Figure 9:
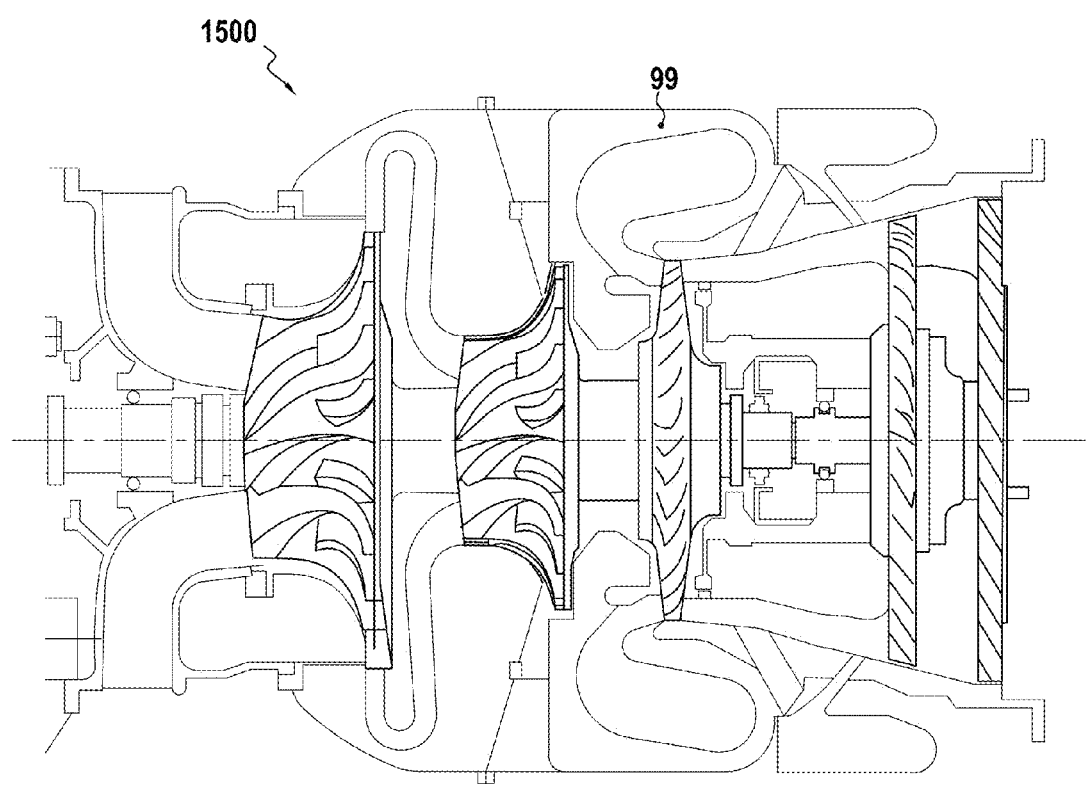
FIG. 9 shows a turbomachine including the fuel flowmeter of the invention.

In these figures, there can be seen a fuel circuit 99 including a fuel flowmeter 110 of the invention that is fed by a pump 112 and that includes a metering valve 114 associated with a regulator device 116. A turbomachine 1500 including the fuel circuit 99 is shown in FIG. 9.

As can be seen in these figures, the fuel flowmeter 110 differs from the prior art flowmeter in that the regulator device 116 also includes a piston 150 acting as a slide suitable for moving along the axis A of the first spring 120, this axis also being the axis along which the valve member 124 can move.

The piston 150 separates the second chamber 130 from a third chamber 152 that is connected to the outlet circuit 132. Consequently, the pressure of fuel in the third chamber 152 is equal to the pressure at the outlet 114b of the metering valve.

The piston 150 comprises a cylindrical body 150a that extends axially towards the valve member 124 from a piston wall 150b.

According to the invention, the third chamber is connected to the second chamber via a channel 154 that is formed, in this example, in an adjustment rod 156 extending along the axis A. It is specified that this adjustment rod 156 is rotatably mounted on a housing 158 of the regulator device 116. This rod 156 presents a first end 156a that forms a screw and that projects outside from the housing 158, and a second end 156b that carries one end of the first spring 120. As in the prior art, the other end of the first spring is connected to the flexible diaphragm 118 and to the valve member 124. This device serves to adjust the prestress of the first spring 120 by axially moving the end of the spring. In the non-exclusive example described herein, the rod 156 screws into the housing 158, thereby enabling the axial position of the end of the spring 120 to be modified and thereby enabling its prestress to be modified. More precisely, the first spring 120 is preferably housed in a cage 160 that is movable along the axis A, with one of its ends carrying the valve member 124.

Figure 3:
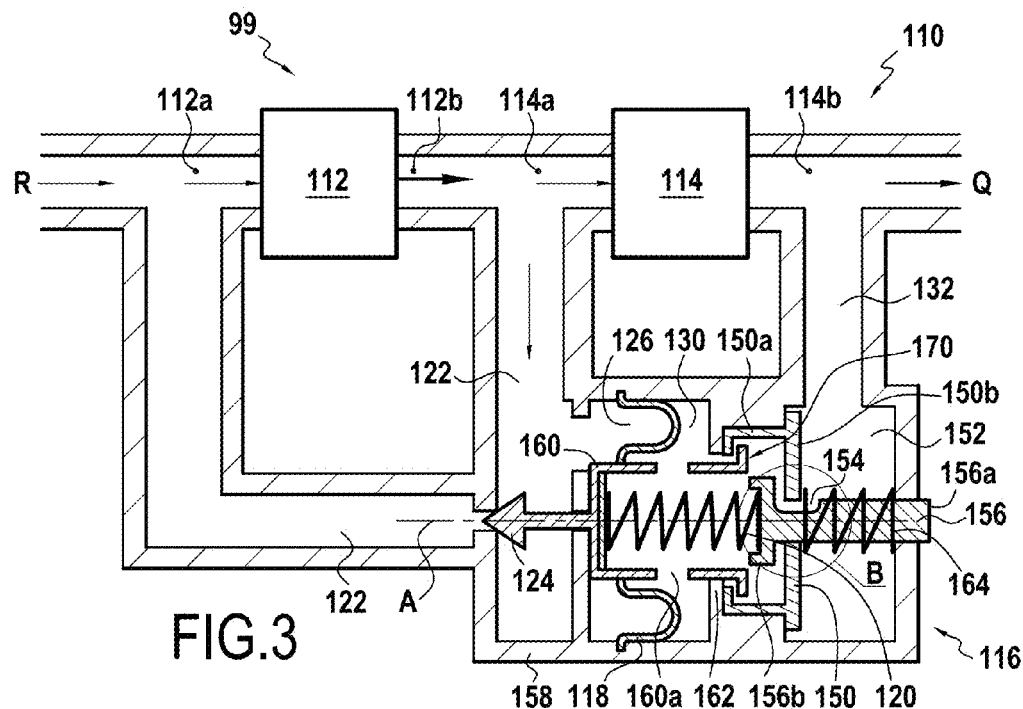
FIG. 3 shows an embodiment of the fuel flowmeter of the invention, in normal operation, with the valve member in its closed position.
Figure 3A:
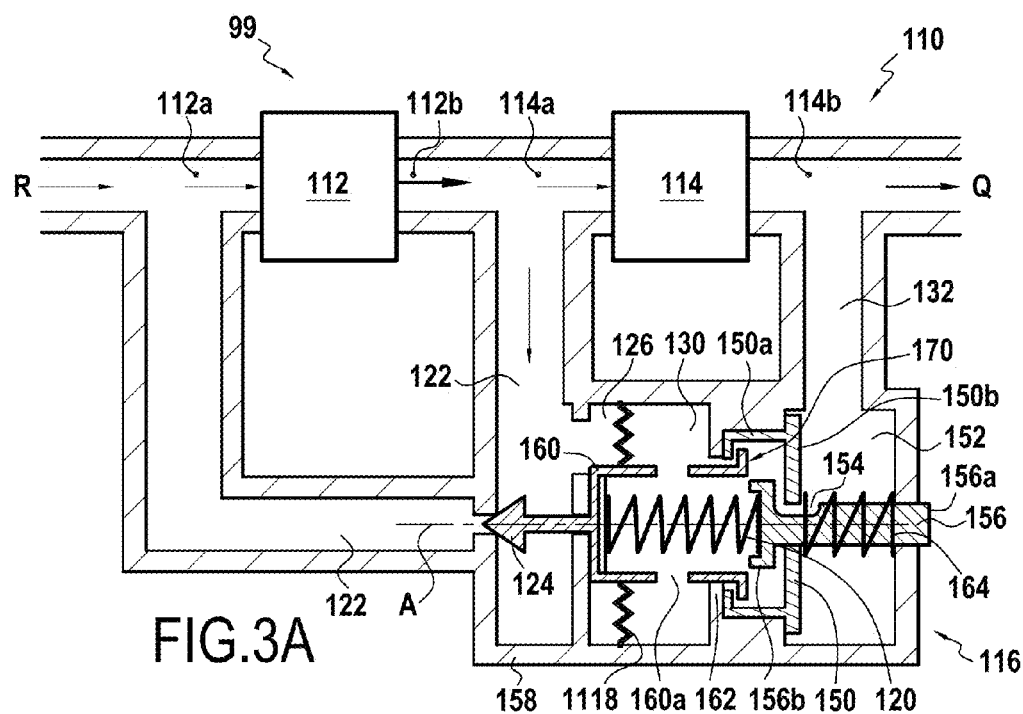
FIG. 3A shows another embodiment of the fuel flowmeter of the invention, in normal operation, with the valve member in its closed position.
Figure 3B:
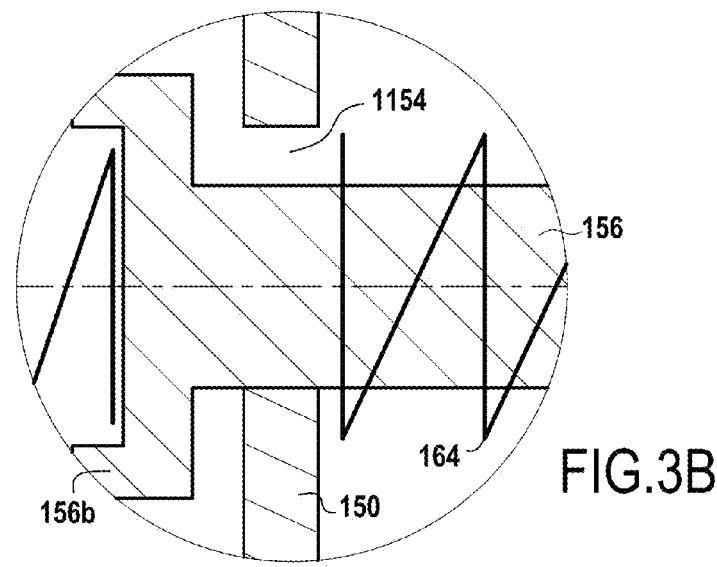
FIG. 3B shows another embodiment of the fuel flowmeter of the invention, in normal operation, with the valve member in its closed position.

In another embodiment shown in FIG. 3A, the flexible diaphragm may be replaced with a bellows 1118. In another embodiment shown in FIG. 3B, the channel 1154 is formed in the piston 150.

This cage 160 presents orifices 160a for allowing fuel to flow through the regulator device.

Still with reference to FIG. 3, it can be seen that the cylindrical body 150a is held axially against a wall 162 of the housing 158, which wall 162 extends transversely relative to the axis A, by means of a second spring 164 that extends axially in the third chamber between the housing 158 and the cylindrical body 150a. The second spring is preferably arranged around the adjustment rod 156.

In this position, referred to as the rest position of the piston 150, it can be seen that a first end 154a of the channel 154 opens out into the second chamber, while the second end 154b of the channel opens out into the third chamber 152, such that both chambers are at the same pressure.

The section of this channel 154 may optionally be determined by design so as that it damps the movements of the valve member 124 as does the nozzle 30a in the prior art.

It is also specified that when the piston is in its rest position, the cage is free to slide relative to the piston 150. Specifically, the cage slides inside the cylindrical body 150a. Furthermore, the second spring 164 is dimensioned so that the piston remains in its rest position when the diaphragm is undamaged.

Thus, in the absence of damage to the diaphragm 118, the regulator device 116 of the invention operates like the device of the prior art.

In FIG. 3, the pressure difference of fuel across the metering valve 114 (i.e. between the outlet 114b and the inlet 114a) is less than the predetermined value, such that the pressure difference is not sufficient for countering the force exerted by the first spring on the valve member 124. The valve member thus remains in the closed position and shuts off the return circuit.

Figure 4:
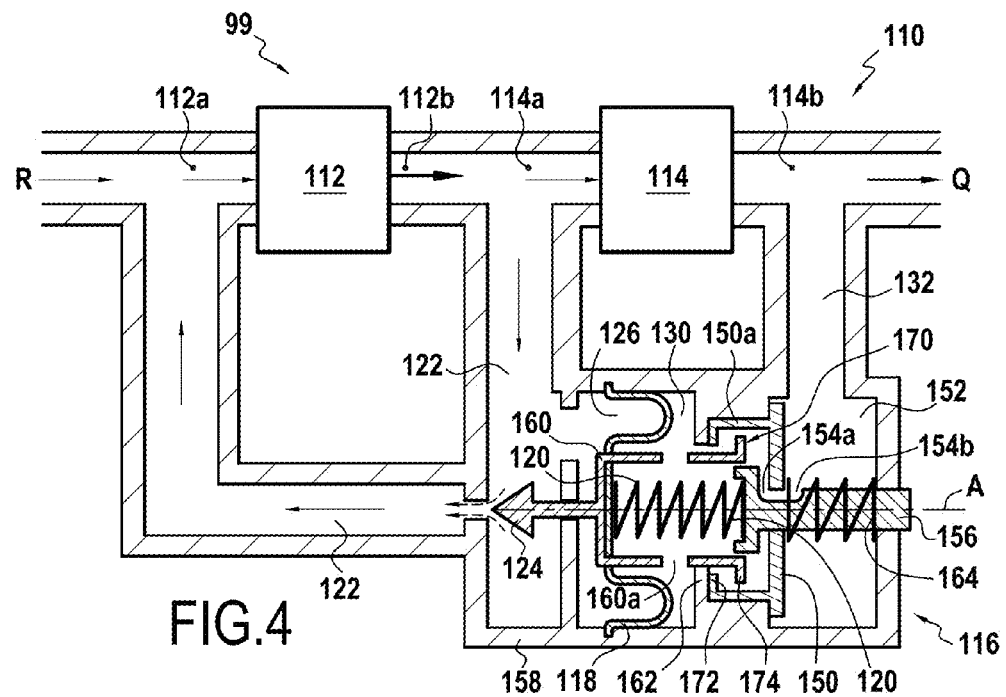
FIG. 4 shows the FIG. 3 flowmeter in normal operation, with the valve member in its open position.

In FIG. 4, the pressure difference of fuel across the metering valve 114 is equal to or greater than the predetermined value, such that the pressure difference acting on the diaphragm 118 generates a force that is equal to or greater than the force exerted by the first spring 120, such that the valve member 124 opens. Fuel can then flow into the return circuit 122, thereby lowering the pressure difference.

Figure 5:
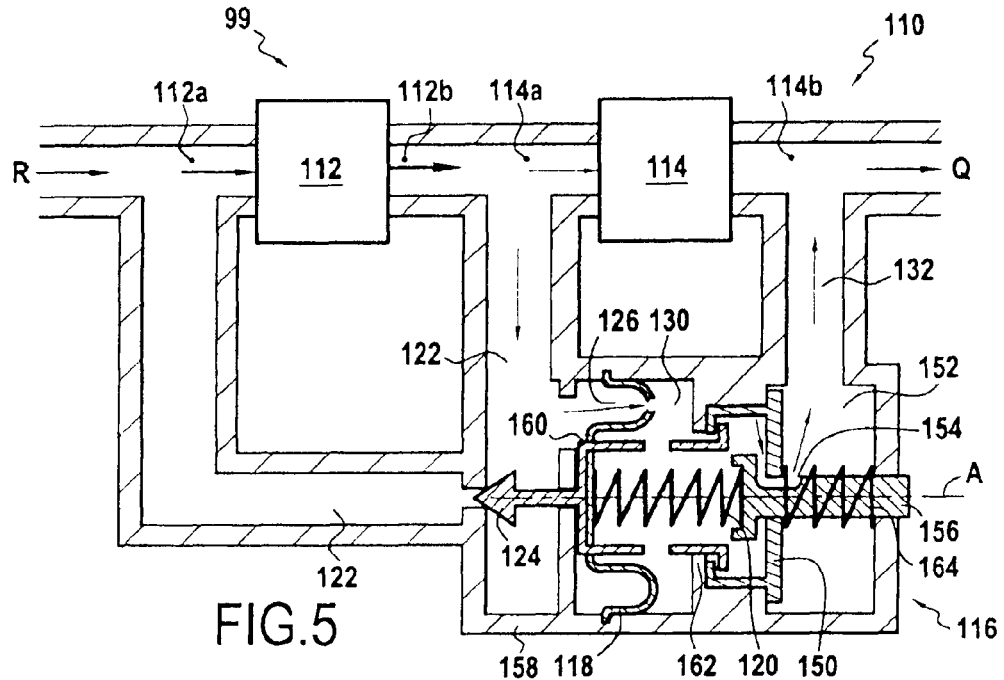
FIG. 5 shows the FIG. 3 flowmeter in degraded operation with the pressure difference detection surface being pierced, the valve member being in its closed position prior to the piston being moved.
Figure 6:
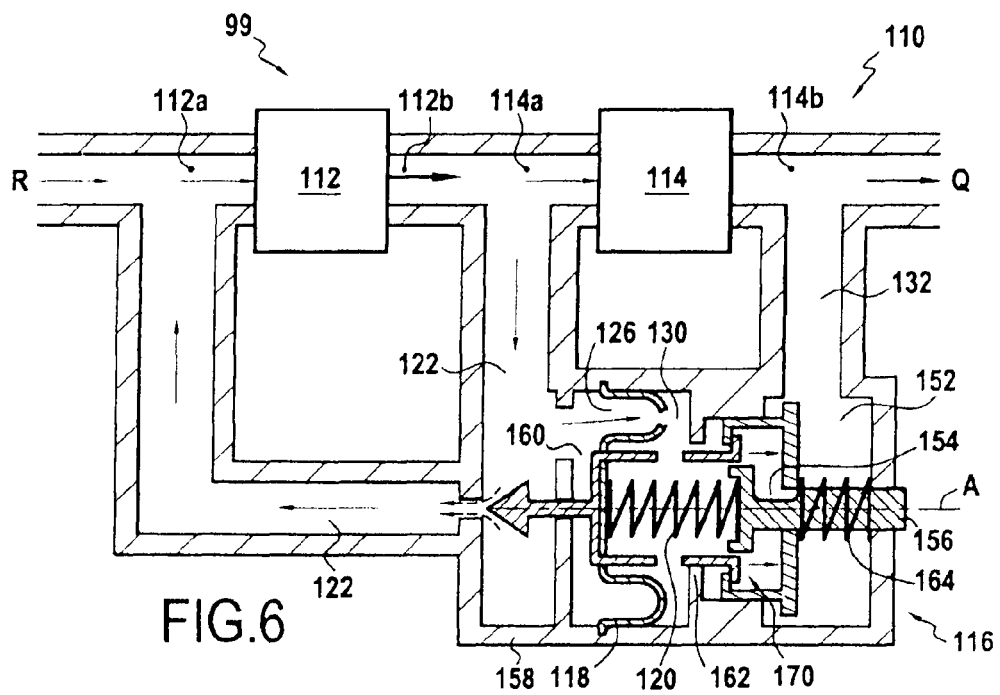
FIG. 6 shows the FIG. 5 flowmeter when the pressure difference detection surface is pierced, with the valve member in its open position and the piston in its regulation position.

It can thus be understood that in normal operation of the fuel flowmeter, i.e. when the diaphragm 118 is not pierced, the piston 150 and the second spring 164 perform no role in regulating the pressure difference. With reference to FIGS. 5 and 6, there follows an explanation of how the regulator device operates in the event of the diaphragm 118 being damaged.

For various reasons, the diaphragm 118 may deteriorate, and consequently may present one or more holes such that the first chamber is put into fluid flow communication with the second chamber. Such an event is shown in FIGS. 5 and 6. There is no longer any pressure difference between the first and second chambers, such that the first spring 120 brings the valve member into its closed position, as shown in FIG. 5.

As can be seen in FIG. 5, when the diaphragm is pierced, the fuel can flow through the diaphragm, and then through the first, second, and third chambers via the channel 154.

The channel preferably presents a diameter that is smaller than the diameter of the second chamber, such that the channel 154 acts as a nozzle creating head loss between the second chamber and the third chamber. This results in a pressure difference between these two chambers that are separated by the piston, with the pressure in the second chamber being higher than the pressure in the third chamber.

If this pressure difference is sufficient to generate a force F on the surface of the piston that is greater than the force exerted on the piston wall by the second piston 164, then the piston is moved axially towards the third chamber 152.

As can be seen in FIG. 6, the slide-forming piston 150 is provided with a coupling member 170 for mechanically coupling the slide with the cage. This coupling member 170 has fingers 172 that extend radially towards the axis A from one end of the piston body. The end of the cage that extends inside the piston body has an abutment surface 174 that is formed by one or more radial projections that are suitable for co-operating with the fingers 172 of the piston body during axial movement of the piston.

With reference to FIG. 6, it can be understood that when the force generated by the pressure differential across the metering valve becomes greater than the force exerted by the second spring 164, the piston moves axially towards the third chamber. During this movement, the fingers 172 of the piston body come into axial contact with the abutment surface 174, after which the piston 150 entrains the cage and the valve member towards the third chamber. The valve member is then taken to its open position, thereby opening the return circuit 122.

Thus, the piston 150 and the springs 120 and 164, in co-operation with the valve member 124, enable the fuel pressure difference to be regulated, in spite of the damage to the diaphragm.

This avoids uncontrolled increase in the rate at which fuel is delivered to the injectors and uncontrolled modification to the relationship between the metered flow rate and the extent to which the valve 114 is opened, as generally occurs in the event of the diaphragm of the prior art flowmeter breaking.

Furthermore, in this example, the movement of the piston is accompanied by the second end 154b of the channel 154 being closed. This serves to eliminate another cause of an increase in the flow rate delivered to the engine, by closing a path for communication between the pump 112 and the injectors.

Without going beyond the ambit of the invention, the channel may be configured in such a manner that it is never closed by the piston, providing the leakage rate through the channel remains acceptable.

Figure 7:
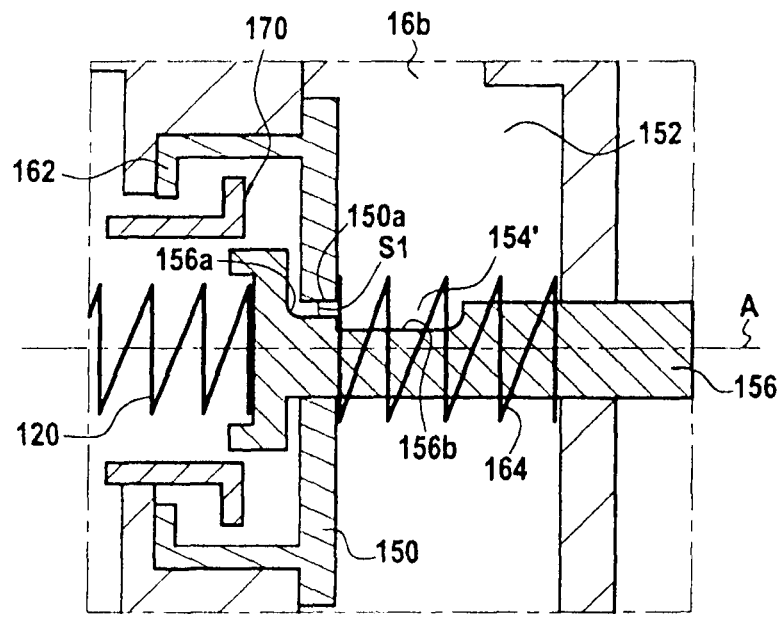
FIG. 7 shows a variant of the FIG. 4 flowmeter, with the piston not coupled to the cage.
Figure 8:
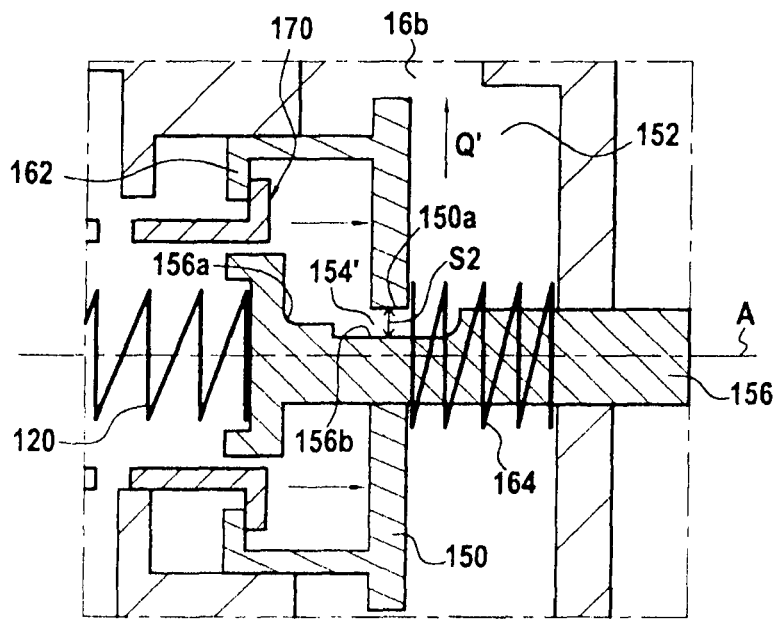
FIG. 8 shows the FIG. 7 flowmeter when the piston is coupled to the cage.

In the variant shown in FIGS. 7 and 8, the channel 154' presents a first section S1 and a second section S2 greater than the first section S1.

As can be seen in FIG. 7, the first section S1 is defined between the head 156a of the adjustment rod and the edge of an opening 150c formed in the piston.

Consequently, when the piston is not coupled to the cage 160, fuel flows through the channel 154' via the first section S1.

With reference now to FIG. 8, it can be understood that the second section S2 is defined between the bottom of a flat 156b formed in the body of the rod 156.

It can clearly be seen that the presence of the flat 156b enables a second section S2 to be obtained that is greater than the first section S1.

When the piston is in its coupled position of FIG. 8, the edge of the opening 150c in the piston faces the flat 156b, thereby allowing fuel to flow through this section S2.

This generates a calibrated excess flow rate Q' that is added to the flow rate Q leaving the metering valve 114.

This excess flow rate may for example be 15 liters per hour (L/h) if the flow rate leaving the metering valve is about 300 L/h. This excess flow rate is calibrated so as to avoid being troublesome for the regulation performed by the metering valve, while nevertheless being detectable.

This excess flow rate Q' is detected by the fact that the regulation system of the metering valve has its regulation relationship modified.

The existence of a flow rate Q" at the inlet to the injectors that is greater than the flow rate Q as delivered solely by the metering valve requires the regulation system to reduce the flow rate delivered by the metering valve so as to return to the flow rate Q that is delivered while the diaphragm is operating normally. This difference is immediately detectable, thereby enabling the pilot to be informed that the pressure difference detection surface is damaged.

The invention claimed is:

1. A fuel flowmeter for being fed by a pump including an inlet and an outlet, the flowmeter comprising:
   a metering valve including an inlet and an outlet and arranged downstream from the outlet of the pump;
   a return circuit connecting the inlet of the metering valve to the inlet of the pump; and
   a pressure regulator device comprising:
   a movable valve member configured to close and open the return circuit;
   a pressure difference detection surface fastened to the valve member and axially separating a first chamber in communication with the inlet of the metering valve from a second chamber in communication with the outlet from the metering valve;
   a first resilient member arranged in the second chamber while being fastened to the detection surface as to exert axial thrust on the valve member in a direction tending to close the return circuit;
   a piston axially separating the second chamber from a third chamber connected to the outlet of the metering valve, the piston including a coupling member configured to co-operate with the valve member;
   a second resilient member arranged in the third chamber while exerting axial thrust on the piston tending to keep the piston decoupled from the valve member; and
   a channel putting the second chamber in communication with the third chamber.

2. A fuel flowmeter according to claim 1, wherein the pressure difference detection surface is a bellows.

3. A fuel circuit for a turbine engine, the circuit comprising the pump and the fuel flowmeter according to claim 1.

4. A turbine engine comprising the fuel circuit according to claim 3.

5. A fuel flowmeter according to claim 1, wherein the pressure difference detection surface is a flexible diaphragm.

6. A fuel flowmeter according to claim 5, wherein the channel is arranged in the piston.

7. A fuel flowmeter according to claim 5, wherein the channel is arranged in a housing.

8. A fuel flowmeter according to claim 1, wherein the valve member is mounted at an end of a sliding cage that extends axially within the second chamber, the first resilient member being housed inside the cage while being held, at an end of the first resilient member opposite from the valve member, by an adjustment rod extending between the second chamber and the third chamber.

9. A fuel flowmeter according to claim 8, wherein the channel is formed in the adjustment rod.

10. A fuel flowmeter according to claim 8, wherein the channel is arranged such that the channel is closed by the piston when the piston is coupled with the cage.

11. A fuel flowmeter according to claim 8, wherein the channel is arranged such that a section of the channel has a defined value that is different from an initial value of the channel when the piston is coupled with the cage.

12. A fuel flowmeter according to claim 8, wherein the piston is in a form of a slide and the coupling member comprises fingers configured to co-operate with an abutment surface of the cage so as to be capable of moving the cage axially and opening the return circuit when the detection surface is damaged.

13. A fuel flowmeter according to claim 8, wherein the second resilient member extends around the adjustment rod.

14. A fuel flowmeter according to claim 8, wherein the second resilient member is a second spring.

15. A fuel flowmeter according to claim 8, wherein the first resilient member is a first spring.

* * * * *